United States Patent
Meyer

(10) Patent No.: US 8,999,425 B2
(45) Date of Patent: Apr. 7, 2015

(54) LOW SODIUM SALT SUBSTITUTE COMPOSITIONS

(71) Applicant: Richard S. Meyer, Kent, WA (US)

(72) Inventor: Richard S. Meyer, Kent, WA (US)

(73) Assignee: JCR Technologies LLC, Kent, WA (US)

( * ) Notice: Subject to any disclaimer, the term of this patent is extended or adjusted under 35 U.S.C. 154(b) by 0 days.

(21) Appl. No.: 13/927,719

(22) Filed: Jun. 26, 2013

(65) Prior Publication Data

US 2013/0287926 A1 Oct. 31, 2013

Related U.S. Application Data

(63) Continuation-in-part of application No. 13/658,589, filed on Oct. 23, 2012, which is a continuation-in-part of application No. 13/343,581, filed on Jan. 4, 2012, now abandoned.

(51) Int. Cl.
| | |
|---|---|
| A23L 1/237 | (2006.01) |
| A23L 1/39 | (2006.01) |
| A23L 1/22 | (2006.01) |

(52) U.S. Cl.
CPC ............... *A23L 1/2375* (2013.01); *A23L 1/39* (2013.01); *A23L 1/237* (2013.01); *A23L 1/22083* (2013.01); *A23L 1/22091* (2013.01)

(58) Field of Classification Search
CPC ........ A23L 1/237; A23L 1/238; A23L 1/2375
USPC .......................... 426/649, 74, 549, 656, 96, 97
See application file for complete search history.

(56) References Cited

U.S. PATENT DOCUMENTS

| | | |
|---|---|---|
| 3,800,052 A | 3/1974 | Inagami et al. |
| 4,828,852 A | 5/1989 | Hsu et al. |
| 5,332,587 A | 7/1994 | Howard et al. |
| 5,562,938 A | 10/1996 | Lee et al. |
| 5,945,146 A | 8/1999 | Twinam |
| 6,403,144 B1 | 6/2002 | El-Khoury et al. |
| 6,544,574 B2 | 4/2003 | El-Khoury et al. |
| 7,309,510 B2 | 12/2007 | Sekula et al. |
| 2003/0008046 A1 | 1/2003 | Gerlat et al. |

(Continued)

FOREIGN PATENT DOCUMENTS

| | | |
|---|---|---|
| EP | 0 919 137 A1 | 6/1999 |
| JP | 58-94368 A | 6/1983 |
| WO | 2008/027360 A1 | 3/2008 |

OTHER PUBLICATIONS

International Preliminary Report on Patentability for PCT/US2007/018885, dated Mar. 3, 2009, 5 pages.

(Continued)

*Primary Examiner* — Helen F Heggestad
(74) *Attorney, Agent, or Firm* — Seed IP Law Group PLLC

(57) ABSTRACT

A low sodium salt substitute composition is disclosed that includes (i) from about 3.0% by weight to about 9.0% by weight of sodium acid sulfate; (ii) from about 2% by weight to about 8% by weight of one or more umami ingredients; (iii) from about 12.0% by weight to about 19.0% by weight of sodium chloride; and (iv) from about 0% by weight to about 95% by weight of a filler, the composition delivering less than 140 mg of sodium while providing an appealing taste to users and complying with the current Food and Drug Administration definition of low sodium.

25 Claims, 1 Drawing Sheet

| | NS-6 | NS-6B |
|---|---|---|
| Low Sodium salt substitute | | |
| Both less than 140 mg. sodium/1.5 gram serving | | |
| | | |
| Sodium acid sulfate (NaHSO4), powder | 5.50 | 5.40 |
| silicon dioxide | 0.11 | 0.21 |
| Sodium chloride (57.88%), fine salt | 12.27 | 12.27 |
| di-Sodium inosinate & guanylate | 3.69 | 3.80 |
| Sea salt | 43.63 | 43.72 |
| Sodium gluconate | 0.28 | 0.28 |
| Natural flavoring | 0.50 | 0.30 |
| Maltodextrin 4 DE (GPC 040) | 34.02 | 34.02 |
| co-spray dry to get coated granules & texture | 100.00 | 100.00 |
| serving size = 1.5 grams | | |

(56) References Cited

U.S. PATENT DOCUMENTS

| | | |
|---|---|---|
| 2005/0186312 A1 | 8/2005 | Loh et al. |
| 2006/0024412 A1 | 2/2006 | Cha et al. |
| 2007/0292592 A1 | 12/2007 | Zasypkin et al. |
| 2008/0050494 A1 | 2/2008 | Meyer |
| 2008/0102186 A1 | 5/2008 | Perlman |
| 2009/0169701 A1 | 7/2009 | Pfeiffer et al. |
| 2010/0055268 A1 | 3/2010 | Meyer |
| 2010/0239740 A1 | 9/2010 | Meyer |
| 2010/0303853 A1 | 12/2010 | Lejeune et al. |
| 2011/0244103 A1 | 10/2011 | Chigurupati |

OTHER PUBLICATIONS

International Search Report and Written Opinion for PCT/US2007/018885, mailed Jan. 29, 2008, 9 pages.

International Search Report and Written Opinion for PCT/US2012/071973, mailed Apr. 26, 2013, 11 pages.

Jungbunzlauer Product Range (tri-fold brochure), Jungbunzlauer AG, Basel, Switzerland 2001, 6 pages.

|  | NS-6 | NS-6B |
|---|---|---|
| Low Sodium salt substitute | | |
| Both less than 140 mg. sodium/1.5 gram serving | | |
| | | |
| Sodium acid sulfate (NaHSO4), powder | 5.50 | 5.40 |
| silicon dioxide | 0.11 | 0.21 |
| Sodium chloride (57.88%), fine salt | 12.27 | 12.27 |
| di-Sodium inosinate & guanylate | 3.69 | 3.80 |
| Sea salt | 43.63 | 43.72 |
| Sodium gluconate | 0.28 | 0.28 |
| Natural flavoring | 0.50 | 0.30 |
| Maltodextrin 4 DE (GPC 040) | 34.02 | 34.02 |
| co-spray dry to get coated granules & texture | 100.00 | 100.00 |
| serving size = 1.5 grams | | |

US 8,999,425 B2

LOW SODIUM SALT SUBSTITUTE COMPOSITIONS

BACKGROUND

1. Technical Field

The present disclosure is directed to low sodium salt substitute compositions and food products comprising the same.

2. Description of the Related Art

There has been growing concern in recent years about the effect of excessive dietary sodium intake. Excessive sodium intake is believed to be the cause of certain deleterious health problems such as various cardiac and renal conditions. Moreover, the accumulation of sodium ions in the body tends to cause an accumulation of fluids, with a corresponding increase in weight, by the body tissues.

The primary source of sodium in the diet is sodium chloride, namely, salt, which enters the diet via multiple pathways including: (i) food naturally containing sodium chloride; (ii) processed foods to which sodium chloride and other sodium salts are added; and (iii) food to which sodium chloride is added by an individual during cooking or prior to eating. The final two pathways have posed the greatest problem of excessive sodium ion intake in the diet.

Significant attention has been directed to ways to remove sodium chloride from the diet, including removal from processed foods. However, the removal of sodium chloride from the human diet poses certain challenges. In particular, the "salty" taste associated with sodium chloride is a particularly important flavor characteristic in many kinds of foods, and foods which do not have a salty taste are often described as "bland" or "tasteless."

Many attempts have been made to provide salty tasting compositions as a substitute for table salt. To this end, potassium chloride, ammonium chloride, and similar compounds have been suggested. However, the use of these chlorides alone or in combination does not provide the desired taste or seasoning effect of sodium chloride. Potassium chloride has a strong aftertaste which is usually characterized as bitter by most people. Ammonium chloride also has a bitter after taste and, when ingested, can produce undesirable side effects. Furthermore, ammonium chloride decomposes at cooking and baking temperatures thereby changing the pH value of the surrounding material affecting the taste and other properties of any cooked foods which contain it.

The Food and Drug Administration (FDA) provides regulatory oversight over the content of food sold in the U.S. Over concerns about the effect of sodium on human health, the FDA has defined "low sodium" to mean less than 140 mg per serving.

Accordingly, while progress has been made in this field, there remains a need in the art for low sodium salt substitute compositions that effectively mimic the flavor of salt and are within the FDA limit of 140 mg per serving. The present disclosure fulfills this need and provides further related advantages.

BRIEF SUMMARY

In brief, the present disclosure is directed to low sodium salt substitute compositions and food products comprising the same.

In one embodiment, a low sodium salt substitute composition is disclosed comprising: (i) from about 3.0% by weight to about 9.0% by weight of sodium acid sulfate; (ii) from about 2% by weight to about 8% by weight of one or more umami ingredients; (iii) from about 12.0% by weight to about 19.0% by weight of sodium chloride; and (iv) from about 0% by weight to about 95% by weight of a filler, wherein the composition delivers less than 140 mg of sodium while providing an appealing taste to users and complying with the current Food and Drug Administration definition of low sodium.

In another embodiment, a food product (such as a low sodium soy sauce food product) comprising the low sodium salt substitute composition is disclosed.

In another embodiment, a low sodium soy sauce food product is disclosed comprising: (i) from about 5.0% by weight to about 19.0% by weight of sodium acid sulfate; (ii) from about 3.0% by weight to about 6.0% by weight of a 50/50 mixture of disodium inosinate and disodium guanylate; (iii) from about 7% by weight to about 8% by weight of a hydrolyzed soy protein; (iv) from about 0.01% by weight to about 0.05% by weight of one or more flavor masking or enhancing agents; (v) from about 12.00% by weight to about 19.0% by weight of sodium chloride; and (vi) from about 0.0% by weight to about 35.0% by weight of a maltodextrin.

In accordance with another aspect of the present disclosure, a low sodium salt substitute composition is provided that includes from about 5.4% by weight to about 8.18% by weight of sodium acid sulfate; from about 2% by weight to about 8% by weight of one or more umami ingredients; from about 43.72% by weight to about 66.26% by weight of sea salt; and from about 0% by weight to about 95% by weight of a filler.

In accordance with another aspect of the present disclosure, a low sodium salt substitute composition is provided that includes by weight the following: from about 0.0% to 34.02% Maltodextrin, from about 3.8% to 5.76% di-Sodium inosinate & guanylate, from about 5.4% to 8.18% sodium acid sulfate, from about 12.27% to 18.6% salt, from about 0.21% to 0.32% silicon dioxide, from about 43.72% to 66.26% sea salt, and 0.28% to 0.42% calcium gluconate.

In accordance with another aspect of the present disclosure, a low sodium salt substitute composition is provided that includes by weight the following: 34.02% Maltodextrin, 3.8% di-Sodium inosinate & guanylate, 5.4% sodium acid sulfate, 12.27% salt, 0.21% silicon dioxide, and 43.72% sea salt, and 0.28% sodium gluconate.

In accordance with another aspect of the present disclosure, a low sodium salt substitute composition is provided that includes by weight the following: 0.0% Maltodextrin, 5.76% di-Sodium inosinate & guanylate, 8.18% sodium acid sulfate, 18.6% salt, 0.32% silicon dioxide, and 66.26% sea salt, and about 42.0% sodium gluconate.

These and other aspects of this disclosure will be evident upon reference to the following detailed description.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the following drawings, wherein:

FIG. 1 is a table of constituents for representative low sodium compositions formed in accordance with the present disclosure.

DETAILED DESCRIPTION

In the following description, certain specific details are set forth in order to provide a thorough understanding of various embodiments of the present disclosure. However, one skilled in the art will understand that the disclosure may be practiced without one or more of these specific details. In other instances, well-known aspects of food products and methods of producing food products have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense to include alternatives and not in the conjunction "and" unless the context clearly dictates otherwise.

Values recited in this specification as a "range" are intended to include the end values noted therein. When values are described as "between" two end values, the end values in this case are not intended to be included.

As noted above, the present disclosure is directed to low sodium salt substitute compositions and food products comprising the same. As used herein, "low sodium" is intended to mean less than the FDA's prescribed limit of 140 mg per serving. A "serving" as used herein is defined to be about 15 grams.

In more specific embodiments, the composition may comprise from about 3% by weight to about 20% by weight of sodium acid sulfate, from about 12% by weight to about 20% by weight of sodium acid sulfate, from about 12% by weight to about 18% by weight of sodium acid sulfate, or from about 12% by weight to about 16% by weight of sodium acid sulfate.

In one embodiment, a low sodium salt substitute composition is disclosed comprising: (i) from about 3.0% by weight to about 9.0% by weight of sodium acid sulfate; (ii) from about 2% by weight to about 8% by weight of one or more umami ingredients; (iii) from about 12.0% by weight to about 19.0% by weight of sodium chloride; and (iv) from about 0% by weight to about 95% by weight of a filler.

In other more specific embodiments, the composition may comprise from about 2% by weight to about 6% by weight of one or more umami ingredients, or from about 3% by weight to about 5% by weight of one or more umami ingredients.

"Umami," often referred to as the fifth taste, is used to describe flavors that are often thought of as pungent, savory, tangy or meaty. The taste is imparted by glutamate, a type of amino acid, and ribonucleotides, including inosinate and guanylate, which occur naturally in many foods including meat, fish, vegetables and dairy products. As used herein "umami ingredients" includes, but is not limited to, ingredients that impart the umami taste, such as monosodium glutamate, disodium inosinate, disodium guanylate, yeast extract (such as DSM Maxarome® Pure), hydrolyzed vegetable protein (such as Sensient Flavors CVP LS hydrolyzed soy protein), flavor masking or enhancing agents (such as Ungerer natural bitter masking agent FS 12059 and Ungerer natural salt enhancing agent FS 12061).

Accordingly, in other more specific embodiments, the one or more umami ingredients are selected from monosodium glutamate, disodium inosinate, disodium guanylate, yeast extract, hydrolyzed vegetable protein and flavor masking or enhancing agents.

In other more specific embodiments, the composition may comprise from about 12.27% by weight to about 18.26% by weight of potassium chloride.

In other more specific embodiments, the composition may comprise from about 45% by weight to about 95% by weight of a filler, from about 75% by weight to about 95% by weight of a filler, from about 30% by weight to about 80% by weight of a filler, from about 30% by weight to about 66% by weight of a filler, or about 0% by weight of a filler.

As used herein, "filler" refers to a bland or tasteless ingredient used to dilute or bulk a composition, such as a dextrin or maltodextrin. Accordingly, in other more specific embodiments, the filler is a dextrin or maltodextrin.

As one of skill in the art will appreciate, the presence of a filler in a low sodium salt substitute composition of the present disclosure is optional. Typically, if the low sodium salt substitute composition is intended for use, for example, as table salt replacement, then a filler may be used to dilute or bulk the composition. However, if the low sodium salt substitute composition is incorporated into a food product during manufacturing, a filler is not necessary.

In another embodiment, a food product comprising any of the foregoing low sodium salt substitute compositions is disclosed. In more specific embodiments, the food product may be a low sodium soy sauce food product.

In another embodiment, a low sodium soy sauce food product is disclosed comprising: (i) from about 3.0% by weight to about 19.0% by weight of sodium acid sulfate; (ii) from about 3.0% by weight to about 6.0% by weight of a 50/50 mixture of disodium inosinate and disodium guanylate; (iii) from about 7% by weight to about 8% by weight of a hydrolyzed soy protein; (iv) from about 0.01% by weight to about 0.05% by weight of one or more flavor masking or enhancing agents; (v) from about 12.00% by weight to about 19.0% by weight of sodium chloride; and (vi) from about 0.0% by weight to about 35.0% by weight of a maltodextrin.

In other more specific embodiments, the low sodium soy sauce food product further comprises from about 12.27% by weight to about 18.6% by weight of sodium chloride.

It is understood that any embodiment of the compositions, as set forth above, may be independently combined with other embodiments of the compositions to form embodiments not specifically set forth above. In addition, in the event that a range of amounts is indicated for any particular ingredient in a particular embodiment, it is understood that all amounts falling within that range will be considered to be within the scope of the present disclosure. For example, the following various embodiments, are within the scope of the present disclosure:

1. A low sodium salt substitute composition comprising a minimum of about 3.0% by weight of sodium acid sulfate, about 2% by weight of one or more umami ingredients, about 19.7% sodium chloride, and a maximum of about 83% by weight of a filler.

2. A low sodium salt substitute composition comprising a maximum of about 8.18% by weight of sodium acid sulfate, about 5% by weight of one or more umami ingredients, 19.7% sodium chloride, and a minimum of about 74% by weight of a filler.

3. A low sodium salt substitute composition comprising a minimum of about 5.4% by weight of sodium acid sulfate, about 2% by weight of one or more umami ingredients, a maximum of about 12.27% by weight of sodium chloride, and a minimum of about 80% by weight of a filler.

4. A low sodium salt substitute composition comprising from about 5% by weight to about 9% by weight of sodium acid sulfate, from about 0% by weight to about 8% by weight of one or more umami ingredients, from about 12% by weight to about 20% by weight of sodium chloride, and from about 53% by weight to about 83% by weight of a filler.

5. A low sodium salt substitute composition comprising from about 5% by weight to about 9% by weight of sodium acid sulfate, from about 2% by weight to about 6% by weight of one or more umami ingredients, from about 12% by weight to about 19.7% by weight of sodium chloride, and from about 66% by weight to about 81% by weight of a filler.

6. A low sodium salt substitute composition comprising from about 5.4% by weight to about 8.18% by weight sodium acid sulfate, from about 3% by weight to about 5% by weight of one or more umami ingredients, from about 12.27% by weight to about 19.7% by weight of sodium chloride, and from about 59% by weight to about 79% by weight of a filler.

7. A low sodium salt substitute composition is provided that includes by weight the following: from about 0.0% to 35% Maltodextrin, from about 3% to 6% di-Sodium inosinate & guanylate, from about 5% to 9% sodium acid sulfate, from about 12% to 20% salt, from about 0.02% to 0.40% silicon dioxide, from about 43% to 67% sea salt, and from 0.2% to 0.5% calcium gluconate (or sodium gluconate).

8. A low sodium salt substitute composition is provided that includes by weight the following: from about 0.0% Maltodextrin, from about 5.76% di-Sodium inosinate & guanylate, from about 8.18% sodium acid sulfate, from about 19.7% salt, from about 0.32% silicon dioxide, from about 60.0% sea salt, and from about 0.42% calcium gluconate. A natural flavoring may be included from about 0.45% by weight.

9. A low sodium salt substitute composition is provided that includes by weight the following: from about 34.02% Maltodextrin, from about 3.8% di-Sodium inosinate & guanylate, from about 5.4% sodium acid sulfate, from about 12.27% salt, from about 0.21% silicon dioxide, from about 35.00% sea salt, and from about 0.28% sodium gluconate. A natural flavoring may be included from about 0.30% by weight. Alternatively, all sea salt can be used from about 56% by weight instead of the salt and sea salt combination set forth above.

As one of skill in the art will appreciate, the low sodium salt substitute compositions disclosed herein may used in a wide variety of food products, including, but not limited to: various types of noodles, such as macaroni and spaghetti; bread; snacks, such as potato chips; processed tomato-based foods, such as tomato juice and tomato puree; soups; various types of sauces and seasonings, such as soy sauce and barbeque sauce; pickled vegetables; various canned fish and dried fish; salt-preserved foods; various types of cheeses; meat products, such as bacon, ham and sausage; and dairy products, such as butter and margarine. Furthermore, as one of skill in the art will appreciate, the amount of low sodium salt substitute composition to be added is selected according to the purpose of use.

The following examples are provided for the purpose of illustration, not limitation. The compositions disclosed herein can be prepared by persons skilled in the art without an undue amount of experimentation using readily known techniques. For example, for use as a table salt substitute, the low sodium salt substitute composition should be dissolved in water and spray dried so that the blend becomes a uniform crystal.

EXAMPLES

Example 1

The following is a representative low sodium salt substitute composition of the present disclosure (all % are % by weight).

Low Sodium Salt Substitute Composition 1

| | |
|---|---|
| Maltodextrin (10 DE) | 60.00% |
| Yeast extract (DSM Maxarome ® Pure) | 2.00% |
| Potassium chloride | 20.00% |
| Disodium inosinate & disodium guanylate (50/50) | 4.00% |
| Sodium acid sulfate | 14.00% |

Example 2

The following is a representative low sodium salt substitute composition of the present disclosure (all % are % by weight).

Low Sodium Salt Substitute Composition 2

| | |
|---|---|
| Maltodextrin (10 DE) | 57.00% |
| Yeast extract (DSM Maxarome ® Pure) | 2.00% |
| Potassium chloride | 25.00% |
| Disodium inosinate & disodium guanylate (50/50) | 4.00% |
| Sodium acid sulfate | 12.00% |

Example 3

The following is a representative low sodium salt substitute composition of the present disclosure (all % are % by weight).

Low Sodium Salt Substitute Composition 3

| | |
|---|---|
| Maltodextrin (10 DE) | 55.80% |
| Yeast extract (DSM Maxarome ® Pure) | 3.20% |
| Potassium chloride | 25.00% |
| Disodium inosinate & disodium guanylate (50/50) | 4.00% |
| Sodium acid sulfate | 12.00% |

Example 4

The following is a representative low sodium salt substitute composition of the present disclosure (all % are % by weight).

Low Sodium Salt Substitute Composition 4

| | |
|---|---|
| Maltodextrin (10 DE) | 55.00% |
| Yeast extract (DSM Maxarome ® Pure) | 2.00% |
| Potassium chloride | 25.00% |
| Disodium inosinate & disodium guanylate (50/50) | 4.00% |
| Sodium acid sulfate | 14.00% |

Example 5

The following is a representative low sodium salt substitute composition of the present disclosure (all % are % by weight).

Low Sodium Salt Substitute Composition 5

| | |
|---|---|
| Maltodextrin (4DE) | 55.00% |
| Potassium chloride | 25.00% |
| Disodium inosinate & disodium guanylate (50/50) | 4.00% |
| Sodium acid sulfate | 16.00% |

Example 6

The following is a representative low sodium salt substitute composition of the present disclosure (all % are % by weight).

Low Sodium Salt Substitute Composition 6

| | |
|---|---|
| Maltodextrin (4DE) | 55.00% |
| Potassium chloride | 25.00% |
| Disodium inosinate & disodium guanylate (50/50) | 4.00% |
| Sodium acid sulfate | 16.00% |

Example 7

The following is a representative low sodium salt substitute composition of the present disclosure (all % are % by weight).

Low Sodium Salt Substitute Composition 7 (V-10a)

| | |
|---|---|
| Maltodextrin (4DE) | 41.24967% |
| Potassium chloride | 18.75% |
| Disodium inosinate & disodium guanylate (50/50) | 3.00% |
| Sodium acid sulfate | 12.00% |
| Salt (sodium chloride) | 25.00% |
| Ungerer natural bitter masking agent (FS 12059) | 0.00025% |
| Ungerer natural salt enhancing agent (FS 12061) | 0.00008% |

Example 8

The following is a representative low sodium salt substitute composition of the present disclosure (all % are % by weight).

Low Sodium Salt Substitute Composition 8 (V-10)

| | |
|---|---|
| Maltodextrin (4DE) | 41.25% |
| Potassium chloride | 18.75% |
| Disodium inosinate & disodium guanylate (50/50) | 3.00% |
| Sodium acid sulfate | 12.00% |
| Salt (sodium chloride) | 25.00% |

Example 9

The following is a representative low sodium salt substitute composition of the present disclosure (all % are % by weight).

Low Sodium Salt Substitute Composition 9 (V-5)

| | |
|---|---|
| Maltodextrin (4DE) | 60.00% |
| Yeast extract (DSM Maxarome ® Pure) | 2.00% |
| Potassium chloride | 20.00% |
| Disodium inosinate & disodium guanylate (50/50) | 14.00% |

Example 10

The following is a representative low sodium chicken soup food product comprising a representative low sodium salt substitute composition of the present disclosure (all % are % by weight).

| | |
|---|---|
| Chicken broth | 36.20% |
| Water | 36.20% |
| Chicken meat, cooked & diced | 13.39% |
| Pasta, cooked | 13.39% |
| Onion powder | 0.16% |
| White pepper, ground | 0.01% |
| Salt (sodium chloride) | 0.16% |
| Potassium chloride | 0.30% |
| Disodium inosinate & disodium guanylate (50/50) | 0.05% |
| Sodium acid sulfate | 0.10% |
| Ungerer natural bitter masking agent (FS 12059) | 0.03% |
| Ungerer natural salt enhancing agent (FS 12061) | 0.01% |

Example 11

The following is a representative low sodium soy sauce food product comprising a representative low sodium salt substitute composition of the present disclosure (all % are % by weight).

| | |
|---|---|
| Molasses (Grandma's Unsulfured) | 1.57% |
| Tamarind concentrate (Seeni USA) | 0.76% |
| Hop extract (Kalsec CPF 045154) | 0.05% |
| Water | 68.14% |
| Malt extract (Malt Products #102) | 5.06% |
| Hydrolyzed soy protein (Sensient CVP LS) | 7.58% |
| Maltodextrin (4DE) | 6.90% |
| Potassium chloride | 3.14% |
| Disodium inosinate & disodium guanylate (50/50) | 0.57% |
| Sodium acid sulfate | 2.01% |
| Salt (sodium chloride) | 4.18% |
| Ungerer natural bitter masking agent (FS 12059) | 0.03% |
| Ungerer natural salt enhancing agent (FS 12061) | 0.01% |

Traditional soy sauce food products comprise high sodium chloride levels, which have a preservative effect on the composition by virtue of low water activity. The above low sodium soy sauce food product has a pH of about 3.46, which has a preservative effect on the composition when pasteurized at 180° F./82° C. for 2 minutes (in other words, the food product becomes shelf-stable). The above low sodium soy sauce food product has about 70% less sodium than commercially available Kikkoman soy sauce.

Referring next to FIG. 1, shown therein is a table of constituents for various representative low sodium compositions. In the two columns is a listing of constituents for two exemplar low sodium salt substitute compositions. Different proportions of the constituents by weight are shown across these two columns.

In the table of FIG. 1, preferred proportions of constituents are shown in two columns. In the first column NS-6, a combination of sodium chloride and sea salt is used with Maltodextrin. In the second column labeled NS-6B is shown the amounts in which the sodium acid sulfate and silicon dioxide along with the di-Sodium inosinate & guanylate, sea salt, and natural flavoring have been changed.

Preferably, the constituents are co-sprayed dry to obtain coated granules & texture.

It is to be understood that variations of the constituents can be made in each of the compositions. Thus, the composition can include in the range from about 12% by weight to about 19% by weight of sodium chloride. Alternatively the composition can include sodium chloride in the range of either about 12.27% by weight to about 18.6% by weight, or about 12.1% by weight to about 18.0% by weight, or about 12.2% by weight to about 18.5% by weight.

Although the foregoing compositions are suitable for many applications, the FDA guidelines described above require servings to have less than 140 mg for a serving size of 1.5 grams in order to be considered "low sodium." The following compositions are formulated to meet or exceed the FDA guidelines while providing superior taste.

In accordance with one aspect of the present disclosure, a low sodium salt substitute composition is provided that includes by weight the following: from about 0% to 34.02% maltodextrin 4 DE (Dextrose Equivalence), from about 3.69% to 3.8% di-sodium inosinate & guanylate, from about 5.4% to 8.18% sodium acid sulfate, from about 12.27% to 18.6% salt, from about 0.11% to 0.21% silicon dioxide, from about 43.63% to 43.72% sea salt, and from about 0.28% to 0.42% sodium gluconate.

These are shown in table form below.

Low Sodium Salt Replacement Composition 1

| | |
|---|---|
| Sea Salt | 43.72% |
| Maltodextrin (4DE) | 34.02% |
| Disodium inosinate & disodium guanylate (50/50) | 3.8% |
| Salt (sodium chloride) | 12.27% |
| Sodium acid sulfate | 5.40% |
| Sodium gluconate | 0.28% |
| Silicon dioxide | 0.21% |

Co-spray dry to get granules.

In accordance with a further and more preferred aspect of the present disclosure, the table below represents another preferred low sodium composition, which is found in FIG. 1:

Low Sodium Salt Replacement Composition 2

| | |
|---|---|
| Maltodextrin (4DE) | 0.0% |
| Sea Salt | 66.26% |
| Salt | 18.6% |
| Sodium acid sulfate | 8.18% |
| Disodium inosinate & disodium guanylate (50/50) | 5.76% |
| Sodium gluconate | 0.42% |
| Silicon dioxide | 0.32% |

Co-spray dry to get granules.

Alternatively, sea salt can be used from about 56% or from about 56% plus-or-minus 5% by weight instead of the combination of salt and sea salt listed above.

A food product is also provided that includes a low sodium salt replacement composition formed in accordance with the compositions of either Composition 1 or Composition 2 set forth above. A natural flavoring may be added to Compositions 1 and 2 in the amount of 0.30% to 0.50% by weight, respectively.

From the foregoing, it will be appreciated that, although specific embodiments of the present invention have been described herein for purposes of illustration, various modifications may be made without deviating from the spirit and scope of the invention. Accordingly, the present invention is not limited except as by the appended claims.

What is claimed is:

1. A low sodium salt replacement composition consisting of:
   from about 0% to 35% maltodextrin;
   from about 3% to 6% di-sodium inosinate & guanylate;
   from about 3.0% to 9% sodium acid sulfate;
   from about 12% to 20% salt;
   from about 0.1% to 0.4% silicon dioxide;
   from about 0.2% to 0.5% calcium gluconate or sodium gluconate; and
   from about 40% to 67% sea salt,
   wherein the composition delivers less than 140 mg sodium per serving.

2. The composition of claim 1 wherein the sodium acid sulfate is 3% by weight.

3. The composition of claim 1 wherein 8.18% by weight of sodium acid sulfate.

4. The composition of claim 1 wherein the sodium acid sulfate is 3% by weight.

5. The composition of claim 1 wherein the maltodextrin is 31%.

6. The composition of claim 1 wherein the maltodextrin is 34.02%.

7. The composition of claim 1 wherein the disodium inosinate and guanylate is 3.8%.

8. The composition of claim 1 wherein the disodium inosinate and guanylate is 3.69%.

9. The composition of claim 1 wherein the salt is 12.27% by weight and the sea salt is 43.72% by weight.

10. The composition of claim 1 wherein the sea salt is 56.0% by weight.

11. The composition of claim 1 wherein the sea salt is 56.0% plus or minus 5% by weight as the only salt.

12. A food product, comprising:
   a low sodium salt substitute composition that consists of:
   from about 0% to 34.02% maltodextrin;
   from about 3.80% to 5.76% di-sodium inosinate & guanylate;
   from about 5.4% to 8.18% sodium acid sulfate;
   from about 12.27% to 19.7% salt;
   from about 0.21% to 0.32% silicon dioxide;
   from about 0.28% to 0.42% calcium gluconate or sodium gluconate; and
   from about 40.87% to 66.26% sea salt.

13. The food product of claim 12, wherein the sodium acid sulfate is 5.4% by weight.

14. The food product of claim 12 wherein the sodium acid sulfate is 8.18% by weight.

15. The food product of claim 12 wherein the sodium acid sulfate is 5.4%.

16. The food product of claim 12 wherein the maltodextrin is 34.02%.

17. The food product of claim 12 wherein the disodium inosinate and guanylate is 3.8%.

18. The food product of claim 12 wherein the disodium inosinate and guanylate is 5.79%.

19. The food product of claim 12 wherein the salt is 12.27% by weight.

20. The food product of claim 12 wherein the salt is 19.7% by weight.

21. The food product of claim 12 wherein the salt is 36.95% by weight.

22. The food product of claim 12 wherein the salt is 40.87% to 43.72% by weight.

23. The food product of claim 12 wherein the salt is 66.26% by weight.

24. The food product of claim 12, wherein the calcium gluconate or sodium gluconate is 0.28% by weight.

25. The food product of claim 12, wherein the calcium gluconate or sodium gluconate is 0.42% by weight.

* * * * *

UNITED STATES PATENT AND TRADEMARK OFFICE
CERTIFICATE OF CORRECTION

| | | |
|---|---|---|
| PATENT NO. | : 8,999,425 B2 | Page 1 of 1 |
| APPLICATION NO. | : 13/927719 | |
| DATED | : April 7, 2015 | |
| INVENTOR(S) | : Richard S. Meyer | |

It is certified that error appears in the above-identified patent and that said Letters Patent is hereby corrected as shown below:

In the claims

Column 10, Line 61:
"13. The food product of claim 12, wherein the sodium acetate sulfate is 5.4% by weight" should read
--13. The food product of claim 12, wherein the sodium acetate sulfate is 3.0% by weight--.

Signed and Sealed this
Seventeenth Day of November, 2015

Michelle K. Lee
*Director of the United States Patent and Trademark Office*